United States Patent
Wang et al.

(10) Patent No.: US 12,275,841 B2
(45) Date of Patent: Apr. 15, 2025

(54) THERMOPLASTIC COMPOSITIONS WITH ULTRA-HIGH DIELECTRIC CONSTANT FOR NANO MOLDING TECHNOLOGY (NMT) APPLICATIONS

(71) Applicant: SHPP GLOBAL TECHNOLOGIES B.V., Bergen op Zoom (NL)

(72) Inventors: Jian Wang, Shanghai (CN); Yun Zheng, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/698,064

(22) PCT Filed: Oct. 5, 2022

(86) PCT No.: PCT/IB2022/059503
§ 371 (c)(1),
(2) Date: Apr. 3, 2024

(87) PCT Pub. No.: WO2023/057920
PCT Pub. Date: Apr. 13, 2023

(65) Prior Publication Data
US 2024/0327634 A1 Oct. 3, 2024

(30) Foreign Application Priority Data
Oct. 6, 2021 (EP) ..................... 21201270

(51) Int. Cl.
*C08K 7/06* (2006.01)
*C08K 7/20* (2006.01)
*C08L 67/02* (2006.01)

(52) U.S. Cl.
CPC ............... *C08L 67/02* (2013.01); *C08K 7/20* (2013.01); *C08K 7/06* (2013.01); *C08L 2203/20* (2013.01); *C08L 2666/55* (2013.01)

(58) Field of Classification Search
CPC ... C08K 7/20; C08K 7/06; C08K 7/04; C08K 3/04
See application file for complete search history.

(56) References Cited

U.S. PATENT DOCUMENTS

| | | | |
|---|---|---|---|
| 4,559,164 A * | 12/1985 | Kostelnik | C08K 7/14 252/502 |
| 6,673,864 B2 * | 1/2004 | Patel | H01B 1/24 524/495 |
| 10,633,537 B2 | 4/2020 | Wang et al. | |
| 2003/0008123 A1 | 1/2003 | Glatkowski et al. | |
| 2015/0086790 A1 | 3/2015 | Kim et al. | |
| 2016/0340507 A1 * | 11/2016 | Ding | C08L 69/00 |
| 2017/0029615 A1 | 2/2017 | He et al. | |
| 2017/0072631 A1 * | 3/2017 | Gallucci | B29C 64/118 |

FOREIGN PATENT DOCUMENTS

| | | |
|---|---|---|
| CN | 107365480 A | 11/2017 |
| WO | 2013/021831 A1 | 2/2013 |
| WO | 2015/200272 A2 | 12/2015 |
| WO | 2019/130269 A1 | 7/2019 |
| WO | 2019/212964 A1 | 11/2019 |
| WO | 2020/131212 A1 | 6/2020 |

OTHER PUBLICATIONS

International Search Report and Written Opinion mailed Dec. 14, 2022 in PCT/IB2022/059503 (11 pgs.).
International Preliminary Report on Patentability mailed Aug. 30, 2023 in PCT/IB2022/059503 (16 pgs.).

* cited by examiner

*Primary Examiner* — Margaret G Moore
(74) *Attorney, Agent, or Firm* — Quicker Law, LLC

(57) ABSTRACT

Thermoplastic compositions include: from about 30 wt % to about 80 wt % of a polymer base resin component; from about 3 wt % to about 20 wt % of a polycarbonate component; from about 2 wt % to about 15 wt % of an impact modifier component; from about 10 wt % to about 50 wt % of a glass fiber component; and from about 0.5 wt % to about 8 wt % of a carbon additive including carbon fiber. The compositions have a dielectric constant (Dk) of at least 5 at a frequency of from 1 GHz to 30 GHz as tested in accordance with a coaxial method.

15 Claims, No Drawings

THERMOPLASTIC COMPOSITIONS WITH ULTRA-HIGH DIELECTRIC CONSTANT FOR NANO MOLDING TECHNOLOGY (NMT) APPLICATIONS

CROSS-REFERENCE TO RELATED APPLICATION

This application is the National Stage of International Application No. PCT/IB2022/059503 filed Oct. 5, 2022, which claims priority to and the benefit of European Application No. 21201270.2 filed Oct. 6, 2021, the disclosures of which are incorporated herein by this reference in their entireties.

FIELD OF THE DISCLOSURE

The present disclosure relates to thermoplastic compositions having a high dielectric constant that are suitable for use in nano molding technology (NMT) applications.

BACKGROUND OF THE DISCLOSURE

Nano-molding technology (NMT) is an innovative technology wherein plastic resins are integrated with metal through convenient injection molding process. NMT materials are widely used in consumer electronics due to excellent features like good metal bonding reliability, high productivity, and good cost efficiency. In particular, the materials are suitable in antenna split applications for mobile devices (e.g., phones and tablets) for better waterproof performance and antenna efficiency.

5G is becoming the main telecommunication network worldwide. The high working frequency of the 5G network introduces new and differing requirements on materials. To get good antenna performance, different strategies can be applied for the antenna split design of 5G mobile devices. Low dielectric constant (Dk) and low dissipation factor (Df) materials can have less impact on the radiofrequency (RF) performance of the device and thus improve antenna efficiency. Accordingly, one strategy is to use low Dk/Df NMT materials in the antenna split applications. Increasing the number of antennas in the 5G mobile device can also improve the overall antenna efficiency. However, space for adding additional antennas in the device is limited. One solution to increase the number of antennas is to reduce the size of each individual antenna. Typically, the length of a patch antenna is determined by the Dk of the substrates. The higher the Dk of the substrate, the shorter the length of the antenna. Therefore, a second strategy for improving antenna efficiency is to use high Dk NMT materials as the antenna substrates. In this case, more antennas can be located in a limited space due to the decrease in antenna size.

Technology for low Dk NMT solutions has been reported. For example, PCT application publication no. WO2019130269 describes thermoplastic resin compositions including a polymer resin, a dielectric glass fiber component, a hollow glass fiber, and an impact modifier.

Further, CN107365480A describes NMT materials of high heat-resisting low-k and preparation methods thereof. The NMT materials include 50-80 parts PCT resin (e.g., poly-terephthalic acid 1,4-CHDM ester), 20-50 parts glass fiber, 3-15 parts toughener, 0.08-1.5 parts antioxidant, and 0.05-3.0 parts lubricant. The NMT materials have high heat-resistance and a relatively low dielectric constant (2.9 at 100 MHz).

However, compositions for high Dk NMT solutions, especially for solutions having a Dk of 4.5 or greater, are not currently known.

These and other shortcomings are addressed by aspects of the present disclosure.

SUMMARY

Aspects of the disclosure relate to thermoplastic compositions including: from about 30 wt % to about 80 wt % of a polymer base resin component; from about 3 wt % to about 20 wt % of a polycarbonate component; from about 2 wt % to about 15 wt % of an impact modifier component; from about 10 wt % to about 50 wt % of a glass fiber component; and from about 0.5 wt % to about 8 wt % of a carbon additive including carbon fiber. The compositions have a dielectric constant (Dk) of at least 5 at a frequency of from 1 GHz to 30 GHz as tested in accordance with a coaxial method.

DETAILED DESCRIPTION

The present disclosure relates to NMT compositions having a very high dielectric constant (Dk), high metal bonding strength and good mechanical performance. Carbon fiber and graphite may be included in the compositions to improve the Dk of the composition. The compositions described herein have very high Dk properties, good TRI bonding strength, high glue adhesion with glass, and good mechanical/processing performance. The very high Dk properties of the compositions makes them good candidates as antenna substrate materials in 5G mobile device technologies.

In specific aspects the disclosure relates to thermoplastic compositions including: a polymer base resin component; a polycarbonate component; an impact modifier component; a glass fiber component; and from about 0.5 wt % to about 8 wt % of a carbon additive including carbon fiber. The composition has a dielectric constant (Dk) of at least 5 at a frequency of from 1 GHz to 30 GHz as tested in accordance with a coaxial method. The combined weight percent value of all components does not exceed 100 wt %, and all weight percent values are based on the total weight of the composition.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polymer base resin" includes mixtures of two or more polymer base resins.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

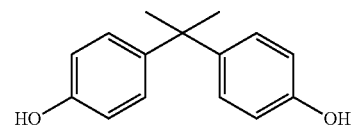 [SMILES: CC(C)(c1ccc(O)cc1)c1ccc(O)cc1]

BisA can also be referred to by the name 4,4-(propane-2,2-diyl)diphenol; p,p'-isopropylidenebisphenol; or 2,2-bis(4-hydroxyphenyl) propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co) polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure relate to thermoplastic compositions including: a polymer base resin component; a polycarbonate component; an impact modifier component; a glass fiber component; and from about 0.5 wt % to about 8 wt % of a carbon additive including carbon fiber. The composition has a dielectric constant (Dk) of at least 5 at a frequency of from 1 GHz to 30 GHz as tested in accordance with a coaxial method. The combined weight percent value of all components does not exceed 100 wt %, and all weight percent values are based on the total weight of the composition.

In certain aspects the composition includes from about 30 wt % to about 80 wt % of a polymer base resin component; from about 3 wt % to about 20 wt % of a polycarbonate component; from about 2 wt % to about 15 wt % of an impact modifier component; from about 10 wt % to about 50 wt % of a glass fiber component; and from about 0.5 wt % to about 8 wt % of a carbon additive including carbon fiber.

In some aspects the polymer base resin component includes polybutylene terephthalate (PBT), polyethylene terephthalate (PET), polyphenylene sulfide (PPS), polyamide (PA), or a combination thereof. In specific aspects the polymer base resin component includes PBT.

In certain aspects the polycarbonate component includes a polycarbonate (PC) homopolymer, a PC copolymer, or a combination thereof. In particular aspects the polycarbonate component includes the PC copolymer, and the PC copolymer includes a PC monomer and an isophthalic acid, terephthalic acid, and resorcinol (ITR) monomer. The PC monomer may be bisphenol-A (BPA) in further aspects. An exemplary PC copolymer is LEXAN™ SLX resin, available from SABIC, which is an ITR-BPA copolymer. The composition may include from about 3 wt % to about 20 wt %, or from about 5 wt % to 20 wt %, or from about 5 wt % to 10 wt %, of the polycarbonate component in some aspects.

The impact modifier may include, but is not limited to, an ethylene-acrylic ester-glycidyl methacrylate terpolymer, an ethylene-glycidyl methacrylate copolymer, a polyolefin copolymer, an ethylene acrylate copolymer, or a combination thereof. In some aspects the polyolefin copolymer includes styrene-ethylene-butylene-styrene (SEBS), styrene-ethylene-propylene-styrene (SEPS), styrene-butadiene-styrene (SBS), or a combination thereof. In specific aspects the impact modifier component includes an ethylene-acrylic ester-glycidyl methacrylate terpolymer. An exemplary impact modifier is LOTADER™ AX8900 from Arkema, which includes glycidyl methacrylate units. available under the trade name LOTADER™ AX8900 from Arkema. The impact modifier may be present in the composition in an amount of from about 2 wt % to about 15 wt %, or from about 2 wt % to about 10 wt %, or from about 2 wt % to about 8 wt %, or from about 2 wt % to about 6 wt %.

In some aspects the glass fiber component includes round glass fiber, flat glass fiber, or a combination thereof. In a particular aspect the glass fiber component includes flat glass fiber. The composition may include in some aspects from about 10 wt % to about 50 wt % of the glass fiber component.

In certain aspects the carbon additive includes chopped carbon fiber having a length of less than 25 millimeters (mm) and a diameter of at least 5 micron. An exemplary carbon fiber suitable for use in aspects of the disclosure is Tenax R Carbon fiber HT C483, available from Teijin.

The carbon additive may further include, but is not limited to, graphite, carbon powder, carbon nanotubes, or a combination thereof.

The composition may further include at least one additional additive. The at least one additional additive may include, but is not limited to, a nucleation agent, a stabilizer, an additional impact modifier, an acid scavenger, an anti-drip agent, an antioxidant, an antistatic agent, a chain extender, a colorant, a de-molding agent, a flow promoter, a lubricant, a mold release agent, a plasticizer, a quenching agent, a flame retardant, a UV stabilizer, or a combination thereof. The at least one additional additive may be included in the thermoplastic composition in any amount that will not significantly adversely affect the desired properties of the composition. In particular aspects the composition includes from about 0.1 wt % to about 2 wt % of the at least one additional additive.

Compositions according to aspects of the disclosure have a dielectric constant (Dk) of at least 5 at a frequency of from 1 GHz to 30 GHz. In further aspects the composition has a Dk of at least 6, at least 7, or from 5-15 at a frequency of from 1 GHz to 30 GHz. In specific aspects the composition has a Dk of at least 5, or at least 6, or at least 7, or from 5-15, at a frequency of 1 GHz. In yet further aspects the composition has a Dk of at least 7, or from 7-15, at a frequency of 3 GHz or at a frequency of 30 GHz. Dk may be measured in accordance with a coaxial method, which includes measuring these values using a coaxial probe and a network analyzer. The sample size was from 40-200 millimeter (mm); the sample thickness was from 0.1-10 mm thick (2-3 mm preferred); the test was performed in a clean room with constant temperature and humidity using 100 mm×45 mm×3.0 mm plaques.

In some aspects the carbon additive includes carbon fiber and the composition has a Dk of at least 7 at a frequency of from 1 GHz to 30 GHz as tested in accordance with the coaxial method.

In specific aspects the composition has a TRI bonding strength of at least 20 MPa as determined in accordance with ISO 19095. In further aspects the composition has a TRI bonding strength of at least 25 MPa, or at least 30 MPa, or at least 35 MPa, or at least 40 MPa, as determined in accordance with ISO 19095

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded. In particular aspects the article is an antenna split for a mobile device.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising:
from about 30 wt % to about 80 wt % of a polymer base resin component;
from about 3 wt % to about 20 wt % of a polycarbonate component;
from about 2 wt % to about 15 wt % of an impact modifier component;
from about 10 wt % to about 50 wt % of a glass fiber component; and from about 0.5 wt % to about 8 wt % of a carbon additive comprising carbon fiber,
wherein the composition has a dielectric constant (Dk) of at least 5 at a frequency of from 1 GHz to 30 GHz as tested in accordance with a coaxial method, and
wherein the combined weight percent value of all components does not exceed 100 wt %, and all weight percent values are based on the total weight of the composition.

Aspect 2. The thermoplastic composition according to Aspect 1, wherein the polymer base resin component comprises polybutylene terephthalate (PBT), polyethylene terephthalate (PET), polyphenylene sulfide (PPS), polyamide (PA), or a combination thereof.

Aspect 3. The thermoplastic composition according to Aspect 1 or 2, wherein the polymer base resin component comprises PBT.

Aspect 4. The thermoplastic composition according to any of Aspects 1 to 3, wherein the polycarbonate component comprises a polycarbonate (PC) homopolymer, a PC copolymer, or a combination thereof.

Aspect 5. The thermoplastic composition according to Aspect 4, wherein the polycarbonate component comprises the PC copolymer, and the PC copolymer comprises a PC monomer and an isophthalic acid, terephthalic acid, and resorcinol (ITR) monomer.

Aspect 6. The thermoplastic composition according to any of Aspects 1 to 5, wherein the impact modifier component comprises an ethylene-acrylic ester-glycidyl methacrylate terpolymer, an ethylene-glycidyl methacrylate copolymer, a polyolefin copolymer, an ethylene acrylate copolymer, or a combination thereof.

Aspect 7. The thermoplastic composition according to any of Aspects 1 to 6, wherein the impact modifier component comprises an ethylene-acrylic ester-glycidyl methacrylate terpolymer.

Aspect 8. The thermoplastic composition according to any of Aspects 1 to 7, wherein the glass fiber component comprises round glass fiber, flat glass fiber, or a combination thereof.

Aspect 9. The thermoplastic composition according to Aspect 8, wherein the glass fiber component comprises flat glass fiber.

Aspect 10. The thermoplastic composition according to any of Aspects 1 to 9, wherein the carbon additive further comprises graphite, carbon powder, carbon nanotubes, or a combination thereof.

Aspect 11. The thermoplastic composition according to any of Aspects 1 to 10, wherein the composition further comprises at least one additional additive.

Aspect 12. The thermoplastic composition according to Aspect 11, wherein the at least one additional additive comprises a nucleation agent, a stabilizer, an additional impact modifier, an acid scavenger, an anti-drip agent, an antioxidant, an antistatic agent, a chain extender, a colorant, a de-molding agent, a flow promoter, a lubricant, a mold release agent, a plasticizer, a quenching agent, a flame retardant, a UV stabilizer, or a combination thereof.

Aspect 13. The thermoplastic composition according to Aspect 11 or 12, wherein the composition comprises from about 0.1 wt % to about 2 wt % of the at least one additional additive.

Aspect 14. The thermoplastic composition according to any of Aspects 1 to 13, wherein the carbon fiber comprises chopped carbon fiber having a length of less than 25 millimeters (mm) and a diameter of at least 5 micron.

Aspect 15. The thermoplastic composition according to any of Aspects 1 to 14, wherein the carbon additive comprises carbon fiber and the composition has a dielectric constant (Dk) of at least 7 at a frequency of from 1 GHz to 30 GHz as tested in accordance with a coaxial method.

Aspect 16. The thermoplastic composition according to any of Aspects 1 to 15, wherein the composition has a TRI bonding strength of at least 35 MPa as determined in accordance with ISO 19095.

Aspect 17. An article comprising the thermoplastic composition according to any of Aspects 1 to 16.

Aspect 18. The article according to Aspect 17, wherein the article is an antenna split for a mobile device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

A comparative composition and example compositions corresponding to the present disclosure were formed and tested. Extrusion and molding profiles for the compositions are provided in Tables 1 and 2, respectively:

TABLE 1

Extrusion Profile for Comparative and Example Compositions

| Parameters | Unit | Condition |
|---|---|---|
| Barrel Size | mm | 1500 |
| Die | mm | 4 |
| Zone 1 Temp | ° C. | 100 |
| Zone 2 Temp | ° C. | 200 |
| Zone 3 Temp | ° C. | 250 |
| Zone 4 Temp | ° C. | 250 |
| Zone 5 Temp | ° C. | 250 |
| Zone 6 Temp | ° C. | 260 |
| Zone 7 Temp | ° C. | 260 |
| Zone 8 Temp | ° C. | 260 |
| Zone 9 Temp | ° C. | 260 |
| Zone 10 Temp | ° C. | 260 |
| Zone 11 Temp | ° C. | 260 |
| Die Temp | ° C. | 260 |
| Screw speed | rpm | 200 |

TABLE 1-continued

Extrusion Profile for Comparative and Example Compositions

| Parameters | Unit | Condition |
|---|---|---|
| Throughput | kg/hr | 50 |
| Torque | % | 70-80 |
| Vacuum 1 | bar | −0.08 |
| Side Feeder 1 speed | rpm | 250 |
| Melt temperature | ° C. | 265-275 |

TABLE 2

Molding Profile for Comparative and Example Compositions

| Parameters | Unit | Condition |
|---|---|---|
| Pre-drying time | Hour | 4 |
| Pre-drying temp | ° C. | 120 |
| Molding Machine | NONE | FANUC, SE180 |
| Mold Type (insert) | NONE | ASTM Tensile, Flexural, & Izod bars |
| | | 100 × 45 × 3.0 mm plaques |
| Hopper temp | ° C. | 50 |
| Zone 1 temp | ° C. | 240-250 |
| Zone 2 temp | ° C. | 250-270 |
| Zone 3 temp | ° C. | 260-280 |
| Nozzle temp | ° C. | 250-270 |
| Mold temp | ° C. | 120-150 |
| Screw speed | rpm | 100 |
| Back pressure | kgf/cm$^2$ | 30 |
| Cooling time | s | 20-30 |
| Injection speed | mm/s | 50-100 |
| Holding pressure | kgf/cm$^2$ | 800-1000 |
| Max. Injection pressure | kgf/cm$^2$ | 1000-1500 |

PBT based NMT compositions were prepared as shown in Table 3; the performance of these compositions is shown in Table 4.

TABLE 3

Comparative and Example Compositions

| Item Description | Unit | C1 | E1.1 | E1.2 | E1.3 |
|---|---|---|---|---|---|
| PBT, low viscosity (SABIC) | % | 32.2 | 32.2 | 30.2 | 29.2 |
| PBT, high viscosity (SABIC) | % | 15 | 12 | 11 | 10 |
| PCP1300 (SABIC) | % | 8 | 8 | 8 | 8 |
| 3PA-830, flat glass (Nittobo) | % | 40 | 40 | 40 | 40 |
| Graphite 1125 (Asbury) | % | | 3 | 6 | 8 |
| Lotader ® AX8900 (Arkema) | % | 4 | 4 | 4 | 4 |
| Other additives (e.g., quencher, mold release, UV stabilizers, antioxidant) | % | 0.8 | 0.8 | 0.8 | 0.8 |

TABLE 4

Properties of Table 3 Compositions

| Property | Conditions | Standard | Unit | C1 | E1.1 | E1.2 | E1.3 |
|---|---|---|---|---|---|---|---|
| Density | Specific gravity | ASTM D792 | g/cm$^3$ | 1.581 | 1.605 | 1.627 | 1.635 |
| MVR | 275° C./5 kg | ASTM D1238 | cm$^3$/10 min | 31 | 28 | 14 | 9 |
| Bonding strength | TRI-treatment | ISO 19095 | MPa | 40.1 | 31.1 | 23.7 | 20.8 |
| Notched Izod | 23° C., 5 lbf/ft | ASTM D256 | J/m | 150 | 127 | 123 | 113 |
| | −30° C., 5 lbf/ft | ASTM D256 | J/m | 118 | 120 | 111 | 106 |
| Un-notched Izod | 23° C., 5 lbf/ft | ASTM D256 | J/m | 880 | 823 | 775 | 558 |
| HDT | 1.82 MPa/3.2 mm | ASTM D648 | ° C. | 211 | 212 | 212 | 213 |
| Flexural Modulus | 3.2 mm, 1.27 mm/min | ASTM D790 | MPa | 10800 | 11500 | 12100 | 12900 |
| Flexural Strength | @break, 3.2 mm | ASTM D790 | MPa | 212 | 211 | 201 | 191 |
| Tensile Modulus | 5 mm/min | ASTM D638 | MPa | 11655 | 12669 | 13574 | 14055 |
| Tensile Strength | @break | ASTM D638 | MPa | 133 | 126 | 117 | 113 |
| Tensile Elongation | @break | ASTM D638 | % | 2.5 | 2.3 | 2.1 | 2.0 |
| Shrinkage | Parallel | ASTM D955 | % | / | 0.20 | 0.24 | 0.24 |
| | Perpendicular | ASTM D955 | % | / | 0.43 | 0.47 | 0.48 |
| Dk | 1 GHz | Coaxial Method | / | 3.74 | 5.15 | 7.84 | 9.78 |

The 'Coaxial Method' for determining Dk includes measuring these values using a coaxial probe and a network analyzer. The sample size was from 40-200 millimeter (mm); the sample thickness was from 0.1-10 mm thick (2-3 mm preferred); the test was performed in a clean room with constant temperature and humidity using 100 mm×45 mm×3.0 mm plaques.

As shown in Table 3, PBT was the base resin, polycarbonate was included as a bonding strength promoter, the impact modifier was AX8900 (an ethylene-acrylic ester-glycidyl methacrylate (GMA) copolymer), and flat glass fiber was the inorganic filler. In addition, graphite was included to increase the Dk of the compositions. As shown, from E1.1 to E1.3 graphite loading was increased from 3 wt % to 6 wt % to 8 wt %, respectively. Composition C1 was a control sample and did not include graphite in the formulation.

As shown in Table 4, when 3 wt % graphite was added, the Dk of the composition increased to 5.15 at 1 GHz (E1.1), much higher than comparative composition C1 (Dk 3.74). Example composition E1.1 also showed good properties, for example the TRI bonding strength>31 megapascals (MPa) and impact strength (NII) 127 Joules per meter (J/m). As graphite content was increased to 6 wt %, the Dk of the composition was further increased to 7.84 at 1 GHz (E1.2), but with much lower TRI bonding strength (23.7 MPa) and flowability (MVR dropped substantially). When 8 wt % graphite was used, the Dk of the composition was 9.78 at 1 GHz (E1.3). However, the TRI bonding strength of the composition further decreased to 20.8 MPa with a much lower NII of 113 J/m.

From this data, it is observed that graphite can be an efficient additive to increase the dielectric constant (Dk) of NMT compositions. When graphite content was not high (i.e., ≤6 wt %), the high Dk NMT solutions showed good TRI bonding strength and mechanical performance. However, when loading of graphite was high (>6 wt %), metal bonding strength, impact strength, and flowability of the compositions was substantially decreased.

Additional example compositions were prepared and tested as shown in Tables 5 and 6, respectively.

TABLE 5

Example Compositions

| Item Description | Unit | E2.1 | E2.2 | E2.3 | E2.4 | E2.5 |
|---|---|---|---|---|---|---|
| PBT, low viscosity (SABIC) | % | 31.2 | 33.2 | 33.2 | 33.7 | 33.2 |
| PBT, high viscosity (SABIC) | % | 10 | 10 | 11 | 11 | 11 |
| PCP1300 (SABIC) | % | 8 | 8 | 8 | 8 | |
| SLX20/80, copolymer (SABIC) | % | | | | | 8 |
| 3PA-830, flat glass (Nittobo) | % | 40 | 40 | 40 | 40 | 40 |
| Tenax ® Carbon fiber HT C483 6 mm (Teijin) | % | 6 | 4 | 3 | 2.5 | 3 |
| Lotader ® AX8900 (Arkema) | % | 4 | 4 | 4 | 4 | 4 |
| Other additives (e.g., quencher, mold release, UV stabilizers, antioxidant) | % | 0.8 | 0.8 | 0.8 | 0.8 | 0.8 |

TABLE 6

Properties of Table 5 Compositions

| Property | Conditions | Standard | Unit | E2.1 | E2.2 | E2.3 | E2.4 | E2.5 |
|---|---|---|---|---|---|---|---|---|
| Density | Specific gravity | ASTM D792 | g/cm$^3$ | 1.605 | 1.599 | 1.590 | 1.581 | 1.598 |
| MVR | 275° C./5 kg | ASTM D1238 | cm$^3$/10 min | 25 | 31 | 30 | 31 | 30 |
| Bonding strength | TRI-treatment | ISO 19095 | MPa | 41.5 | 41.1 | 41.8 | 40.3 | 42.4 |

TABLE 6-continued

Properties of Table 5 Compositions

| Property | Conditions | Standard | Unit | E2.1 | E2.2 | E2.3 | E2.4 | E2.5 |
|---|---|---|---|---|---|---|---|---|
| Notched Izod | 23° C., 5 lbf/ft | ASTM D256 | J/m | 138 | 145 | 154 | 161 | 151 |
| | −30° C., 5 lbf/ft | ASTM D256 | J/m | 112 | 120 | 124 | 127 | 125 |
| Un-notched Izod | 23° C., 5 lbf/ft | ASTM D256 | J/m | 1040 | 930 | 905 | 1080 | 1050 |
| HDT | 1.82 MPa/3.2 mm | ASTM D648 | ° C. | 207 | 208 | 208 | 208 | 207 |
| Flexural Modulus | 3.2 mm, 1.27 mm/min | ASTM D790 | MPa | 14000 | 13200 | 13000 | 12300 | 13000 |
| Flexural Strength | @break, 3.2 mm | ASTM D790 | MPa | 242 | 235 | 234 | 234 | 238 |
| Tensile Modulus | 5 mm/min | ASTM D638 | MPa | 15643 | 14523 | 13975 | 12283 | 14073 |
| Tensile Strength | @break | ASTM D638 | MPa | 155 | 157 | 151 | 138 | 153 |
| Tensile Elongation | @break | ASTM D638 | % | 2.1 | 2.2 | 2.2 | 2.2 | 2.3 |
| Shrinkage | Parallel | ASTM D955 | % | 0.23 | 0.19 | / | / | / |
| | Perpendicular | ASTM D955 | % | 0.30 | 0.41 | / | / | / |
| Dk | 1 GHz | Coaxial Method | / | 13.85 | 10.25 | 8.90 | 7.91 | 8.54 |
| Dk | 3 GHz | Coaxial Method | / | 12.70 | 9.80 | 8.68 | 7.78 | 8.22 |
| Dk | 30 GHz | Coaxial Method | / | 12.60 | 8.30 | 7.48 | 7.06 | 7.33 |

The compositions of Table 5 had even higher Dk properties for NMT compositions. Carbon fiber was used as the additive to improve the Dk of the composition. From E2.1 to E2.4, loading of the carbon fiber was decreased from 6 wt %, 4 wt %, 3 wt % and 2.5 wt %, respectively. In E2.5, a polycarbonate copolymer (SLX20/80) was included as a bonding strength promoter. SLX20/80 has the following chemical structure:

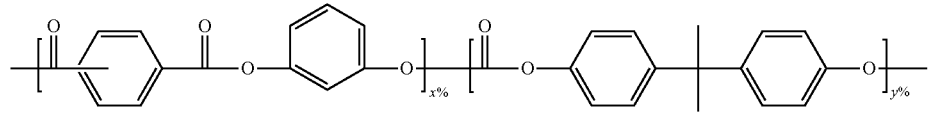

In this general structure, x and y can vary from 10 to 90. SLX20/80 identifies the copolymer as having x=20 (the isophthalic acid, terephthalic acid, and resorcinol (ITR) block) and y=80 (the polycarbonate (PC) block).

As shown in Table 6, when 6 wt % carbon fiber was added, the Dk of the composition was as high as 13.85 at 1 GHz (E2.1), much higher than the corresponding composition in E1.2 that included graphite. From these results it is observed that carbon fiber was much more efficient than graphite in increasing the Dk of the composition. At a testing frequency of 30 GHz, the Dk of the E2.1 composition was still at a high level of 12.6. Further, the E2.1 composition also had very good overall performance. The TRI bonding strength of the composition was 41.5 MPa, similar to the control sample in C1 with a TRI bonding strength of 40.1 MPa. Mechanical performance of the composition was also very good with an NII of 138 J/m and a flexural modulus of 14 GPa.

When the carbon fiber was decreased to 4 wt %, 3 wt %, and 2.5 wt %, respectively, as shown in E2.2 to E2.4, the Dk of the compositions at 1 GHz decreased to 10.25, 8.9, and 7.91, respectively. These are still very high levels suitable for high Dk NMT compositions. Similar Dk performance was observed at higher frequencies. The TRI bonding strength of these compositions was very good with values greater than 40 MPa. When the carbon fiber content decreased from 6% to 2.5%, the NII of the composition increased from 138 to 161 J/m (E2.1 to E2.4).

As shown in example composition E2.5, a PC copolymer (e.g., an ITR-PC copolymer) could be used as a bonding strength promoter. This composition had good overall performance. When compared with the composition with a PC homopolymer E2.3, the Dk of the composition was a little lower with its Dk of 8.54 at 1 GHz. Other properties, including metal bonding strength and mechanical properties were comparable to those of PC homopolymer.

From Tables 5 and 6, it was thus observed that carbon fiber is a very efficient additive to increase the dielectric constant Dk of the compositions. Compositions including carbon fiber as the high Dk filler, PBT as the base resin, PC homo polymer or PC copolymer as the bonding strength promoter, glass fiber as the filler, and an impact modifier demonstrated very high Dk, high bonding strength (>40 MPa), and very good mechanical performance.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:
   from about 30 wt % to about 50 wt % of a polymer base resin component;
   from about 5 wt % to less than 10 wt % of a polycarbonate component;
   from about 2 wt % to about 8 wt % of an impact modifier component;
   from about 30 wt % to about 50 wt % of a glass fiber component; and
   from about 0.5 wt % to about 8 wt % of a carbon additive comprising carbon fiber,
   wherein the composition has a dielectric constant (Dk) of at least 5 at a frequency of from 1 GHz to 30 GHz as tested in accordance with a coaxial method, and
   wherein the combined weight percent value of all components does not exceed 100 wt %, and all weight percent values are based on the total weight of the composition.

2. The thermoplastic composition according to claim 1, wherein the polymer base resin component comprises polybutylene terephthalate (PBT), polyethylene terephthalate (PET), polyphenylene sulfide (PPS), polyamide (PA), or a combination thereof.

3. The thermoplastic composition according to claim 1, wherein the polymer base resin component comprises PBT.

4. The thermoplastic composition according to claim 1, wherein the polycarbonate component comprises a polycarbonate (PC) homopolymer, a PC copolymer, or a combination thereof.

5. The thermoplastic composition according to claim 4, wherein the polycarbonate component comprises the PC copolymer, and the PC copolymer comprises bisphenol A and an isophthalic acid, terephthalic acid, and resorcinol (ITR) monomer.

6. The thermoplastic composition according to claim 1, wherein the impact modifier component comprises an ethylene-acrylic ester-glycidyl methacrylate terpolymer, an ethylene-glycidyl methacrylate copolymer, a polyolefin copolymer, an ethylene acrylate copolymer, or a combination thereof.

7. The thermoplastic composition according to claim 1, wherein the impact modifier component comprises an ethylene-acrylic ester-glycidyl methacrylate terpolymer.

8. The thermoplastic composition according to claim 1, wherein the glass fiber component comprises round glass fiber, flat glass fiber, or a combination thereof.

9. The thermoplastic composition according to claim 1, wherein the carbon additive further comprises graphite, carbon powder, carbon nanotubes, or a combination thereof.

10. The thermoplastic composition according to claim 1, wherein the carbon fiber comprises chopped carbon fiber having a length of less than 25 millimeters (mm) and a diameter of at least 5 micron.

11. The thermoplastic composition according to claim 1, wherein the composition further comprises at least one additional additive comprising a nucleation agent, a stabilizer, an additional impact modifier, an acid scavenger, an anti-drip agent, an antioxidant, an antistatic agent, a chain extender, a colorant, a de-molding agent, a flow promoter, a lubricant, a mold release agent, a plasticizer, a quenching agent, a flame retardant, a UV stabilizer, or a combination thereof.

12. The thermoplastic composition according to claim 1, wherein the carbon additive comprises carbon fiber and the composition has a dielectric constant (Dk) of at least 7 at a frequency of from 1 GHz to 30 GHz as tested in accordance with a coaxial method.

13. The thermoplastic composition according to claim 1, wherein the composition has a TRI bonding strength of at least 35 MPa as determined in accordance with ISO 19095.

14. An article comprising the thermoplastic composition according to claim 1.

15. The article according to claim 14, wherein the article is an antenna split for a mobile device.

* * * * *